(12) United States Patent
Magnavacca (10) Patent No.: US 11,262,719 B2
(45) Date of Patent: Mar. 1, 2022

(54) NEAR FIELD COMMUNICATION FOR DEVICE CONFIGURATION

(71) Applicant: Siemens Schweiz AG, Zürich (CH)

(72) Inventor: Sylvain Magnavacca, Hong Kong (HK)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 17/004,725

(22) Filed: Aug. 27, 2020

(65) Prior Publication Data
US 2021/0266712 A1 Aug. 26, 2021

(30) Foreign Application Priority Data
Feb. 25, 2020 (EP) .................................. 20159392

(51) Int. Cl.
*G05B 19/042* (2006.01)
*H04B 5/00* (2006.01)
(Continued)

(52) U.S. Cl.
CPC ......... *G05B 19/042* (2013.01); *H01Q 1/3233* (2013.01); *H04B 5/00* (2013.01);
(Continued)

(58) Field of Classification Search
CPC ........ G05B 19/042; G05B 2219/25124; G05B 2219/2614; H04W 4/38; H04W 4/00;
(Continued)

(56) References Cited

U.S. PATENT DOCUMENTS

| 2013/0201316 A1* | 8/2013 | Binder | H04L 67/12 348/77 |
| 2014/0068089 A1* | 3/2014 | Brandsma | H04L 12/2809 709/227 |

(Continued)

FOREIGN PATENT DOCUMENTS

| EP | 3561666 | 10/2019 | G06F 8/65 |
| EP | 3591902 | 1/2020 | H04L 12/28 |

(Continued)

OTHER PUBLICATIONS

Anuj Kumar and Manoj Kumar singh, "Sensing Technologies for Monitoring Intelligent Buildings: A Review", IEEE sensors journal, vol. 18, No. 12, Jun. 15, 2018, pp. 4847 to 4855. (Year: 2018).*

(Continued)

*Primary Examiner* — Hassan Kizou
*Assistant Examiner* — Abdullahi Ahmed
(74) *Attorney, Agent, or Firm* — Slayden Grubert Beard PLLC (57) ABSTRACT

Various embodiments include a device comprising: two connectors for powering the device; a controller to operate an HVAC system; a memory; a transponder controller and an antenna for near field communication; and a transponder memory storing a configuration version and an address list. Firmware in the transponder memory includes instructions for the controller to: connect to a handheld device; determine an address thereof; determine whether the address is on the list; if so: receive initial configuration data from the handheld device, and store it in the transponder memory. There is firmware in the device memory telling it to: connect to the transponder controller; read a device version; read the configuration version in the transponder memory; determine whether the configuration version is compatible with the device version; and if so, transfer the initial configuration (Continued)

data to the memory, and thereafter use the initial configuration data in operation of the system.

15 Claims, 6 Drawing Sheets (51) Int. Cl.

| | |
|---|---|
| *H04B 7/185* | (2006.01) |
| *H04L 29/06* | (2006.01) |
| *H04W 4/38* | (2018.01) |
| *H01Q 1/32* | (2006.01) |
| *H04L 9/06* | (2006.01) |
| *H04L 67/55* | (2022.01) |
| *H04L 12/22* | (2006.01) |
| *H04W 4/00* | (2018.01) |

(52) U.S. Cl.
CPC ......... *H04B 7/1858* (2013.01); *H04L 9/0643* (2013.01); *H04L 63/083* (2013.01); *H04L 67/26* (2013.01); *H04W 4/38* (2018.02); *G05B 2219/25124* (2013.01); *G05B 2219/2614* (2013.01); *G08C 2201/00* (2013.01); *H04L 12/22* (2013.01); *H04W 4/00* (2013.01)

(58) Field of Classification Search
CPC ........ H04W 4/70; H04W 4/80; H01Q 1/3233; H04L 9/0643; H04L 67/26; H04L 63/083; H04L 12/22; H04L 67/12; H04B 5/00; H04B 7/1858; G08C 2201/00
See application file for complete search history.

(56) References Cited

U.S. PATENT DOCUMENTS

| | | | | |
|---|---|---|---|---|
| 2014/0297206 | A1* | 10/2014 | Silverman | H02J 3/381 702/58 |
| 2016/0138821 | A1* | 5/2016 | Shaull | F24F 11/62 700/276 |
| 2017/0086281 | A1* | 3/2017 | Avrahamy | B01D 61/147 |
| 2017/0364106 | A1* | 12/2017 | Smith | F24F 11/62 |
| 2020/0257792 | A1* | 8/2020 | Rivard | H04L 9/0894 |
| 2021/0160658 | A1* | 5/2021 | Mars | G06Q 20/306 |

FOREIGN PATENT DOCUMENTS

| | | | | |
|---|---|---|---|---|
| WO | 2017 218300 | | 12/2017 | ............. H04L 12/28 |
| WO | 2018 104431 | | 6/2018 | ................ F24F 1/00 |

OTHER PUBLICATIONS

Search Report for EP Application No. 20159392.8, 10 pages.

* cited by examiner

NEAR FIELD COMMUNICATION FOR DEVICE CONFIGURATION

CROSS-REFERENCE TO RELATED APPLICATIONS

This application claims priority to EP Application No. 20159392.8 filed Feb. 25, 2020, the contents of which are hereby incorporated by reference in their entirety.

TECHNICAL FIELD

The present disclosure relates to room devices in a building. Various embodiments of the teachings herein include methods for configuring a room device in a building including the use of near field communication to configure a room device.

BACKGROUND

Residential, commercial, and/or industrial buildings commonly have a plurality of actuators such as valves and/or damper actuators to control heating, ventilation, and/or air conditioning (HVAC). These buildings can also include actuators to set the positions of blinds. Actuators can also be employed to switch and to dim lights. In addition to such actuators, sensors such as light sensors, temperature sensors, sensors for measuring particulate matter, and/or presence detectors may be used. The sensors and the actuators are distributed throughout the various parts of a structure. They typically come with a communication interface and/or with a communication controller to communicate with one another and/or with a system unit. The system unit can be installed on-site.

The system unit can, by way of non-limiting examples, comprises a thermostat such as a smart thermostat. The thermostat can provide a processor, a memory, and a display. The thermostat can also provide buttons and/or a touch screen such as a capacitive touch screen to interact with users. Appliances such as thermostats, actuators and/or sensors generally require configuration during installation and/or commissioning. An operator then transfers configuration data such as temperature setpoints, schedules, network configurations, etc to the appliance. The configuration data facilitate operation of the appliance. The configuration data can also facilitate communication of the appliance within a system of networked devices.

International patent application WO2018/104431A1 describes a HVAC actuator 1 having an electric motor 11 and a power limiting circuit 12. An energy buffer 13 and a motor controller 15 for the motor 11 both connect to the power limiting circuit 12. The HVAC actuator 1 can also comprise a near field communication (NFC) module. The near field communication module is configured to activate the HVAC actuator 1. A user can rely on the near field communication module to activate the HVAC actuator 1 in a wireless manner. A user can also push a manual switch such as a button to activate the HVAC actuator 1.

Patent application EP3561666A1 describes a mobile device having access rights management, wherein a mobile maintenance device 1 includes a processor 6 and a display 4. The display 4 can be a touch-screen display. A driver unit 5 connects the processor 6 to the display 4. The processor 6 is in operative communication with a first communication interface 2. The first communication interface 2 can comprise a transponder for near field communication. The first communication interface 2 having a transponder for near field communication affords reading a signal originating from another unit having near field communication. The other unit can be an appliance 7. To that end, EP3561666A1 teaches an appliance 7 having a transponder for near field communication mounted to or secured relative to its housing. The mobile device 1 can receive data indicative of the identity of the appliance 7 via the interface 2. To that end, the interface 2 has a transponder for near field communication.

Patent application EP3591902A1 describes a mobile device showing a plant view and a dashboard, wherein mobile handheld device 1 may include an augmented reality device. The mobile handheld device 1 also has a communication interface 2 with a transponder for near field communication.

Patent application US2016/138821A1 describes NFC configuration of HVAC equipment.

SUMMARY

The teachings of the instant disclosure describe systems and processes for installation and for commissioning of HVAC components in buildings. Some embodiments of the teachings herein harness transponders for near field communication in order to configure and commission room devices such as thermostats and/or smart thermostats. For example, some embodiments include a room device (1) comprising: two or more connectors (2a, 2b, 15) for providing building power to the room device (1); a device controller (3a) configured to operate a heating, ventilation and/or air-conditioning system (4); a device memory (3b) in operative communication with the device controller (3a); wherein the device memory (3b) and the device controller (3a) require building power for standard operation; a transponder controller (5a) and an antenna (5c) for near field communication; a transponder memory (5b) in operative communication with the transponder controller (5a), the transponder memory (5b) storing a configuration version and an address list; wherein the transponder controller (5a) is powerable by the antenna (5c); wherein the room device (1) comprises a transponder firmware stored in the transponder memory (5b), the transponder firmware including instructions causing the transponder controller (5a) upon providing power to the transponder controller (5a) to: connect to a handheld device (10) such that the transponder controller (5a) is in operative communication with the handheld device (10); determine an address of the handheld device (10) based on the connection to the handheld device (10); determine if the address list comprises the address of the handheld device (10); if the address list comprises the address of the handheld device (10): produce a signal indicative of the configuration version; transmit the signal indicative of the configuration version to the handheld device (10); after transmission of the signal indicative of the configuration version, receive initial configuration data from the handheld device (10); store the initial configuration data in the transponder memory (5b); the room device (1) further comprising a device firmware stored in the device memory (3b), the device firmware including instructions causing the device controller (3a) upon providing building power to the room device (1) to: connect to the transponder controller (5a) such that the device controller (3a) is in operative communication with the transponder controller (5a); read a device version stored in the device memory (3b); read the configuration version stored in the transponder memory (5b); determine if the configuration version is compatible with the device version; if the configuration version is compatible with the device version: transfer the initial configuration data stored in the transponder memory (5b) to the device memory (3b); and thereafter use the initial configuration data in operation of the system (4).

In some embodiments, the configuration version comprises a configuration revision number and the device version comprises a device revision number; wherein the device firmware includes instructions causing the device controller (3a) upon providing building power to the room device (1) to: compare the configuration revision number to the device revision number; if the configuration revision number matches the device revision number: transfer the initial configuration data stored in the transponder memory (5b) to the device memory (3b); and thereafter use the initial configuration data in operation of the system (4).

In some embodiments, the configuration version comprises a configuration revision number and the device version comprises a device revision number; wherein the device firmware includes instructions causing the device controller (3a) upon providing building power to the room device (1) to: compare the configuration revision number to the device revision number; if the configuration revision number is less than or equals the device revision number: transfer the initial configuration data stored in the transponder memory (5b) to the device memory (3b); and thereafter use the initial configuration data in operation of the system (4).

In some embodiments, the device firmware includes instructions causing the device controller (3a) upon providing building power to the room device (1) to: read a lookup table stored in the device memory (3b); use the lookup table to determine if the configuration version is compatible with the device version; if the configuration version is compatible with the device version: transfer the initial configuration data stored in the transponder memory (5b) to the device memory (3b); and thereafter use the initial configuration data in operation of the system (4).

In some embodiments, the configuration version comprises a configuration revision number and the device version comprises a device revision number; wherein the device firmware includes instructions causing the device controller (3a) upon providing building power to the room device (1) to: read a lookup table stored in the device memory (3b); use the lookup table to determine if the configuration revision number is compatible with the device revision number; if the configuration revision number is compatible with the device revision number: transfer the initial configuration data stored in the transponder memory (5b) to the device memory (3b); and thereafter use the initial configuration data in operation of the system (4).

In some embodiments, the device firmware includes instructions causing the device controller (3a) upon providing building power to the room device (1) to: after transferring the initial configuration data, use the initial configuration data in communication within the system (4) and operation of the system (4).

In some embodiments, the transponder firmware includes instructions causing the transponder controller (5a) upon providing power to the transponder controller (5a) to: read the configuration version stored in the transponder memory (5b).

In some embodiments, the transponder firmware includes instructions causing the transponder controller (5a) upon providing power to the transponder controller (5a) to: read the address list stored in the transponder memory (5b).

In some embodiments, the transponder firmware includes instructions causing the transponder controller (5a) upon providing power to the transponder controller (5a) to: connect to a handheld device (10) such that the transponder controller (5a) is in operative communication with the handheld device (10); receive an access key from the handheld device (10); read a transponder key stored in the transponder memory (5b); determine if the access key matches the transponder key; if the access key matches the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the transponder firmware includes instructions causing the transponder controller (5a) upon providing power to the transponder controller (5a) to: connect to a handheld device (10) such that the transponder controller (5a) is in operative communication with the handheld device (10); receive an access key from the handheld device (10); compute a hashed access key from the access key using a hash function; read a transponder key stored in the transponder memory (5b); determine if the hashed access key matches the transponder key; if the hashed access key matches the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the room device (1) comprises a device switch (11) connected to the device controller (3a); wherein the device switch (11) is selectively moveable between an enabled position and a disabled position; wherein the device firmware includes instructions causing the device controller (3a) upon providing building power to the room device (1) to: read a first position signal from the device switch (11); produce a first position value from the first position signal; and if the first position value indicates that the device switch (11) is in its enabled position: connect to the transponder controller (5a) such that the device controller (3a) is in operative communication with the transponder controller (5a).

In some embodiments, the room device (1) comprises a transponder switch (12) connected to the transponder controller (5a); wherein the transponder switch (12) is selectively moveable between an enabled position and a disabled position; wherein the transponder firmware includes instructions causing the transponder controller (5a) upon providing power to the transponder controller (5a) to: read a second position signal from the transponder switch (12); produce a second position value from the second position signal; and if the second position value indicates that the transponder switch (12) is in its enabled position: connect to a handheld device (10) such that the transponder controller (5a) is in operative communication with the handheld device (10).

In some embodiments, the room device (1) comprises a first visible indicator (13) connected to the device controller (3a); wherein the device firmware includes instructions causing the device controller (3a) upon providing building power to the room device (1) to: determine if the configuration version is compatible with the device version; and if the configuration version is compatible with the device version: activate the first visible indicator (13).

In some embodiments, the room device (1) comprises a second visible indicator (14) connected to the device controller (3a); wherein the device firmware includes instructions causing the device controller (3a) upon providing building power to the room device (1) to: determine if the configuration version is compatible with the device version; and if the configuration version is compatible with the device version: activate the first visible indicator (13); otherwise: activate the second visible indicator (14).

In some embodiments, the room device (1) comprises a system communication bus (15) configured to couple the device controller (3a) to the heating, ventilation and/or air-conditioning system (4) such that the device controller (3a) enters into operative communication with the heating, ventilation and/or air-conditioning system (4); wherein the system communication bus (15) comprises the two or more wires for providing building power to the room device (1); and wherein the system communication bus (15) is configured to transmit data signals of the system communication bus (15) along with building power.

BRIEF DESCRIPTION OF THE DRAWINGS

Various aspects of the teachings herein are apparent to those skilled in the art from the following detailed description of the disclosed non-limiting embodiments. The drawings that accompany the detailed description can be briefly described as follows.

DETAILED DESCRIPTION

The present disclosure describes various room devices such as a room device for a heating, ventilation and/or air-conditioning system. The room device requires configuration during installation and/or commissioning. To that end, configuration data can be applied to the room device using near field communication. Near field communication allows configuration data to be saved to a transponder for near field communication while the device is not yet supplied with building power. To supply the transponder with power, a handheld unit may be placed in the vicinity of an antenna of the transponder. The handheld unit transmits a radio frequency signal to the antenna. The handheld unit thus supplies the antenna with power and the antenna can supply antenna power to the transponder controller.

Since configuration takes place at a stage when the room device is not powered on, the transponder controller can erroneously receive unsuitable initial configuration data. If such unsuitable configuration data are used by a device controller of the room device, the device may turn dysfunctional. It follows that one or more room devices of a heating, ventilation and/or air-conditioning system may malfunction due to unsuitable configuration data.

The instant disclosure described various systems and/or methods including a compatibility determination before using the initial configuration data. To that end, a compatibility determination is carried out between a configuration version of the initial configuration data and a device version of the room device. Such room devices afford backward compatibility. That is, a room device having a device version will accept initial configuration data if the device version is later than the configuration version of the configuration data. In some embodiments, the room device requires exact compatibility between the configuration version of the initial configuration data and the device version.

In some embodiments, the room device may apply a nuanced and flexible approach to compatibility. A lookup table can be used that maps device versions to configuration versions. The lookup table provides configuration versions that are compatible with the room device to be configured. In some embodiments, the room device may accept configuration data from certain handheld devices only. To that end, the transponder controller of the room device may check an address of the handheld device and/or a cryptographic key.

In some embodiments, a mechanical switch inhibits transfer of initial configuration data to the transponder controller. That way, an operator and/or a user can mechanically inhibit misconfigurations. For similar reasons, a mechanical switch can also inhibit transfer of initial configuration data to the device controller. To further alleviate installation and/or commissioning, a visible indicator may signal compatible or incompatible configuration versions. The visible indicator is advantageously situated to provide an indicator to an operator and/or to a user. The visible indicator may connect to the device controller and/or to the transponder controller.

Figure 1:
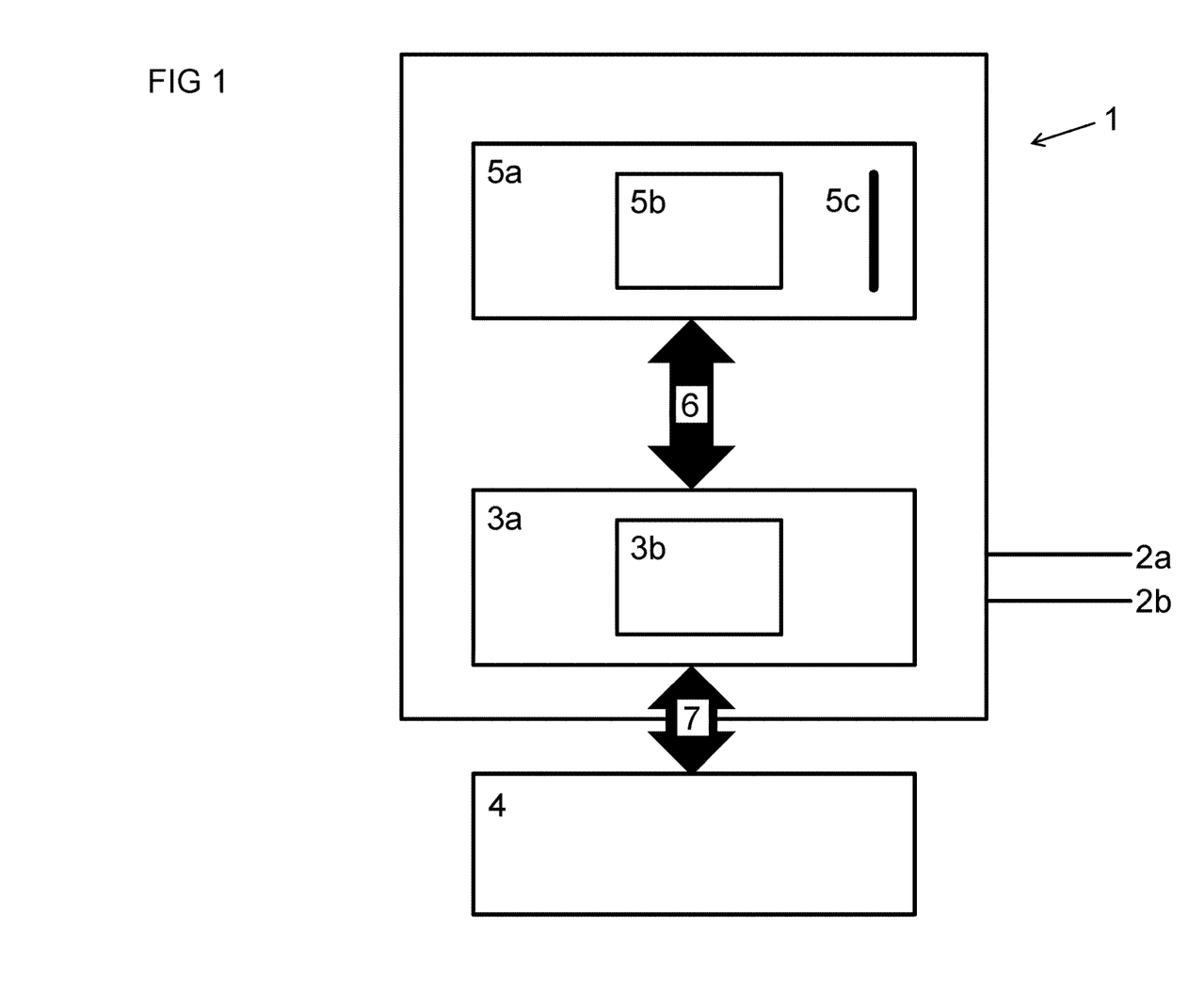
FIG. 1 is a schematic view of a room device having near field communication functionality, incorporating teachings of the present disclosure.

FIG. 1 shows a room device 1 having a transponder controller 5a and a device controller 3a. The transponder controller 5a is preferably different from the device controller 3a. A communication bus 6 connects the transponder controller 5a to the device controller 3a. In some embodiments, the communication bus 6 is or comprises an internal communication bus.

The communication bus 6 enables transfer of data such as initial configuration data from the transponder controller 5a to the device controller 3a. In some embodiments, the initial configuration data pertains to operation of a heating, ventilation and/or air-conditioning system 4. To that end, the initial configuration data can comprise:

a temperature setpoint of the heating, ventilation and/or air-conditioning system 4, and/or a temperature setpoint for the heating, ventilation and/or air-conditioning system 4, and/or a blinds position of the heating, ventilation and/or air-conditioning system 4, and/or a blinds position for the heating, ventilation and/or air-conditioning system 4, and/or a valve position of a heat exchanger of the heating, ventilation and/or air-conditioning system 4, and/or a valve position for a heat exchanger of the heating, ventilation and/or air-conditioning system 4.

In some embodiments, the initial configuration data comprises parameters and/or topology data of a trained neural network. It is envisaged that the trained neural network is employed to control the heating, ventilation and/or air-conditioning system 4 by calculating a setpoint. The setpoint can, by way of non-limiting example, be a temperature setpoint and/or a valve position. To that end, the trained neural network provides an output node. The trained neural network also provides one or more input nodes. In an embodiment, readings of temperature sensors and/or readings of pressure sensors and/or readings of humidity sensors and/or readings of air quality sensors within a building are provided to such input nodes.

The parameters can, by way of non-limiting example, comprise weights of connections between neurons of the trained neural network. The parameters can also provide activation functions of individual neurons such as sigmoid activation functions $$sig(x) = \frac{1}{1+e^{-x}}$$

and/or rectifier functions $$rect(x) = \max(0, x).$$

The topology data can, by way of non-limiting examples, comprise information about numbers of layers of the trained neural network, about numbers of neurons in each layer, about connections between those layers, about biased neurons, etc.

The room device 1 can connect to the heating, ventilation and/or air-conditioning system 4. The room device 1 can also be part of the heating, ventilation and/or air-conditioning system 4. It is envisaged that a communication bus 7 such as an external communication bus connects the room device 1 to the heating, ventilation and/or air-conditioning system 4. In a special embodiment, a communication bus 7 such as an external communication bus connects the device controller 3a to the heating, ventilation and/or air-conditioning system 4.

Figure 2:
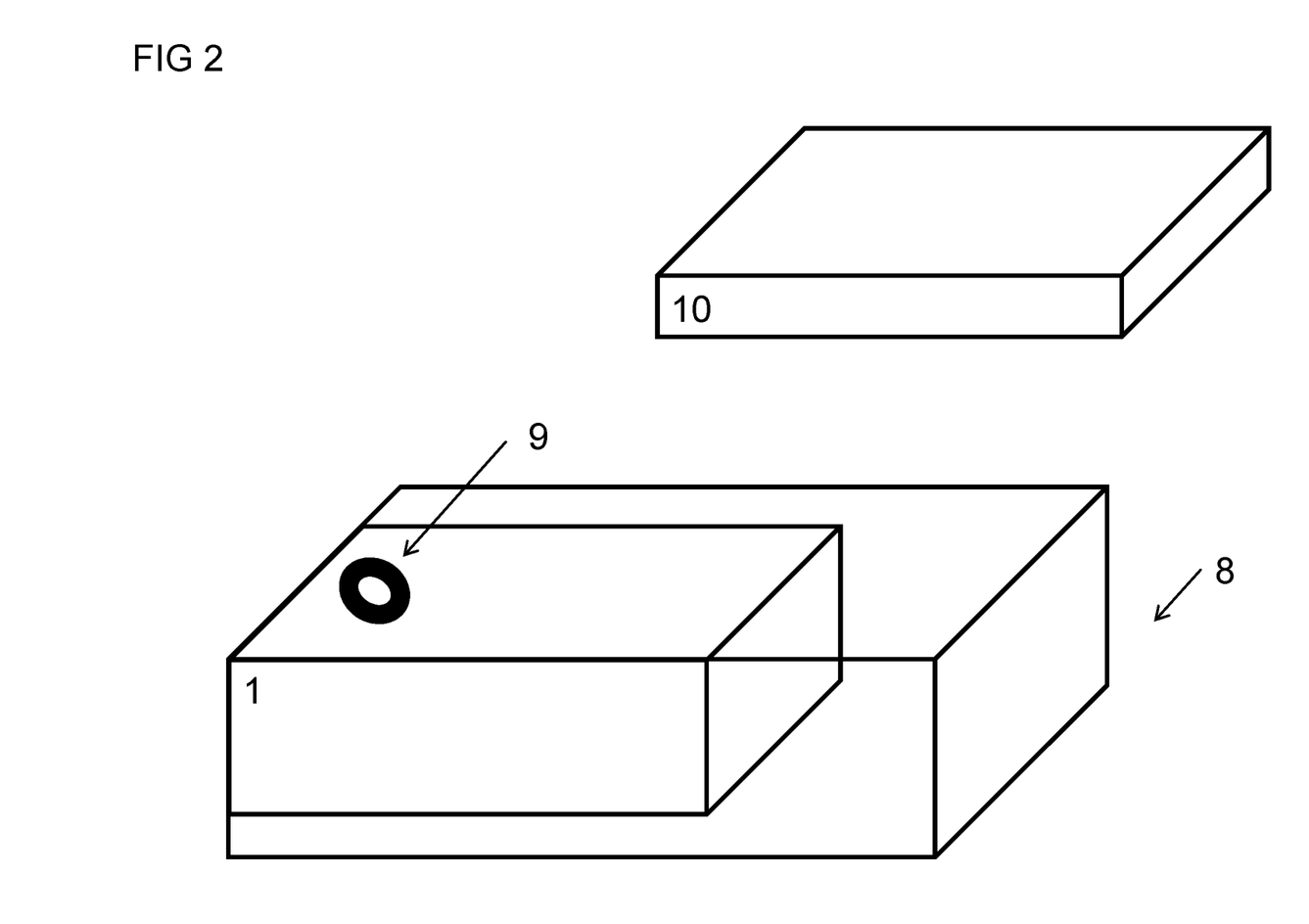
FIG. 2 illustrates a cardboard box storing a room device, the cardboard box having one or more markings to facilitate configuration via near field communication, incorporating teachings of the present disclosure.

FIG. 2 depicts a cardboard box 8 and a room unit 1 placed inside the cardboard box 8. One or more markings 9 on the cardboard box 8 indicate where to place a handheld device 10. A handheld device 10 placed at or near the marking 9 can communicate with a room device 1, even if the cardboard box 8 is not open.

Figure 3:
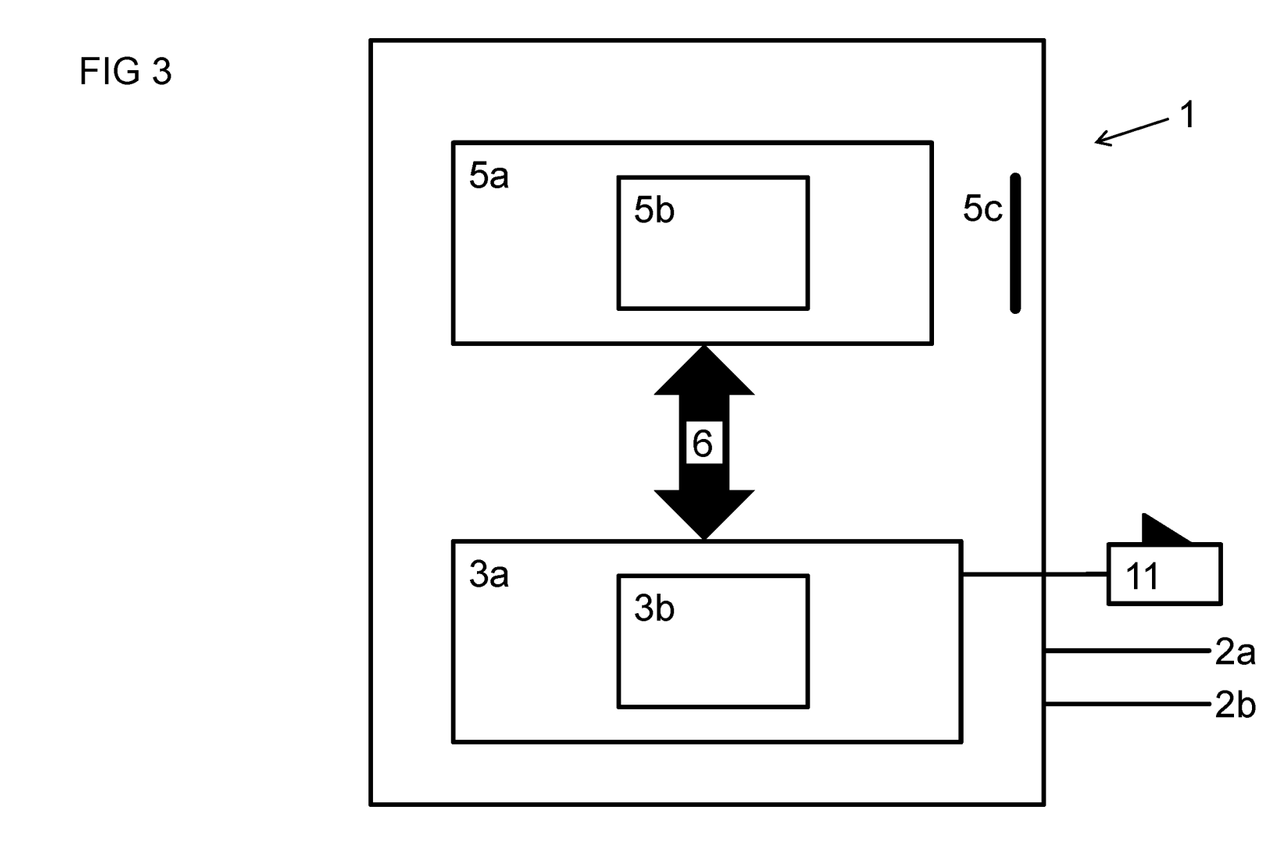
FIG. 3 depicts a room device having a switch to enable or to disable device configuration, incorporating teachings of the present disclosure.

FIG. 3 illustrates a room unit 1 having a switch 11. The switch 11 connects to the device controller 3a. It is envisaged that the switch 11 comprises at least one of:
  a manual switch, and/or
  a button, and/or
  a dual-in-line switch, and/or
  a fingerprint scanner, and/or
  an iris scanner, and/or
  a proximity sensor such as an infrared proximity sensor.

Figure 4:
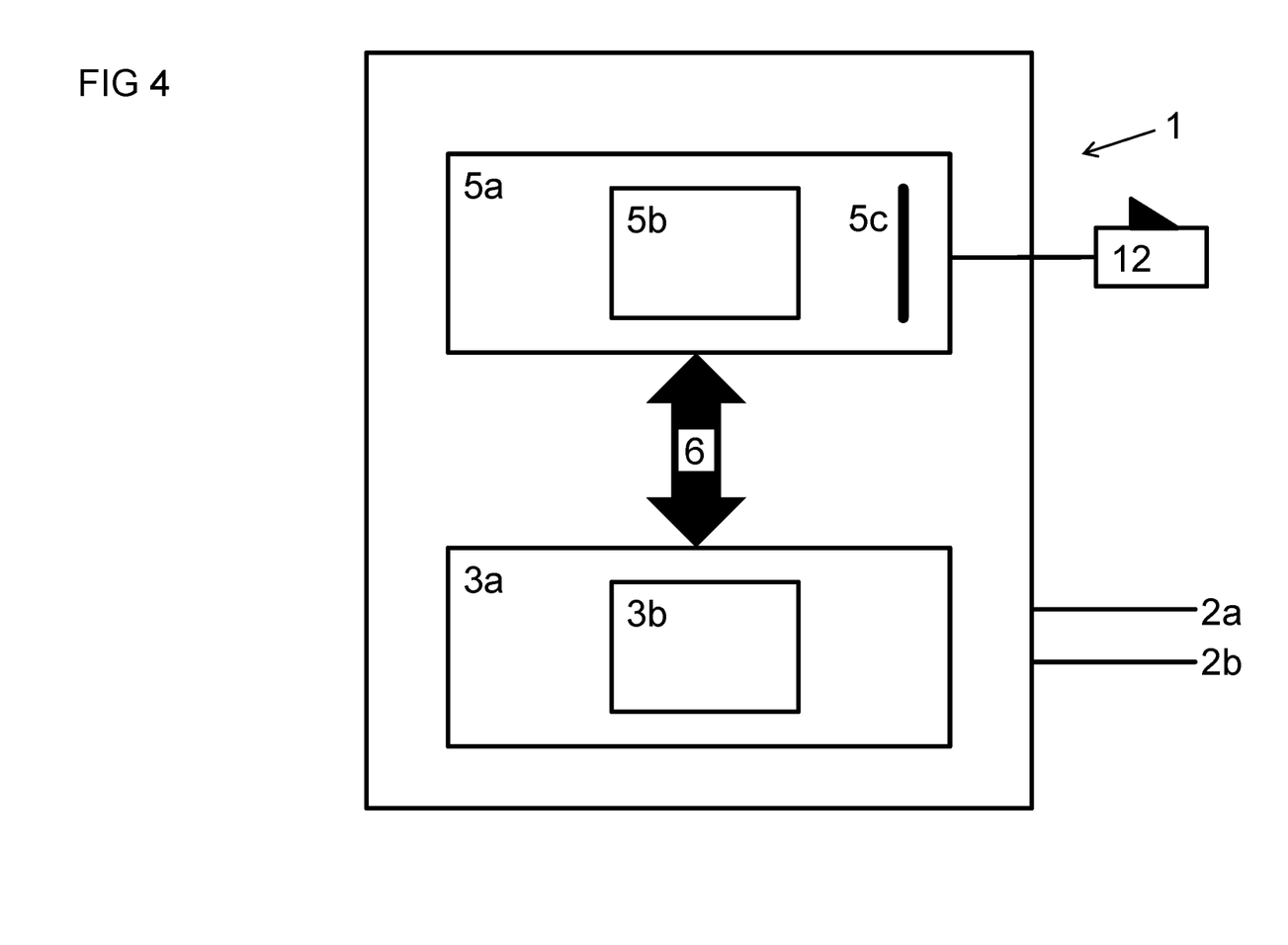
FIG. 4 depicts a room device having a switch to enable or to disable configuration via the transponder, incorporating teachings of the present disclosure.

The switch 12 as shown on FIG. 4 connects to the transponder controller 5a rather than to the device controller 3a. The switch 12 can be employed to inhibit misconfiguration at the transponder level. It is envisaged that the switch 12 comprises at least one of:
  a manual switch, and/or
  a button, and/or
  a dual-in-line switch, and/or
  a fingerprint scanner, and/or
  an iris scanner, and/or
  a proximity sensor such as an infrared proximity sensor.

Figure 5:
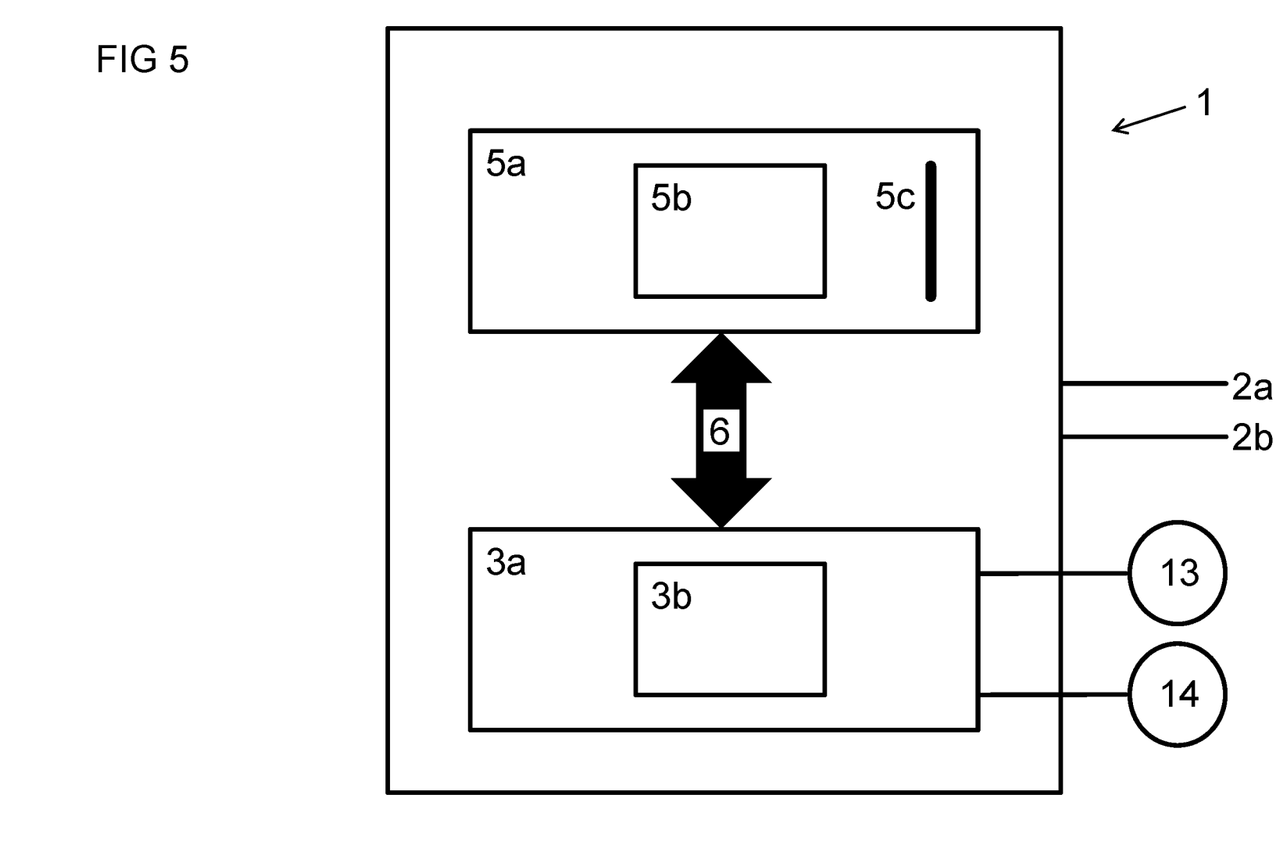
FIG. 5 depicts a room device having visible indicators, incorporating teachings of the present disclosure.

In some embodiments, the room device 1 can signal compatibility and/or incompatibility by activating visible indicators 13, 14. FIG. 5 depicts two such visible indicators 13, 14. The visible indicators 13, 14 connect to the device controller 3a. It is also envisaged that visible indicators connect to the transponder controller 5a.

Figure 6:
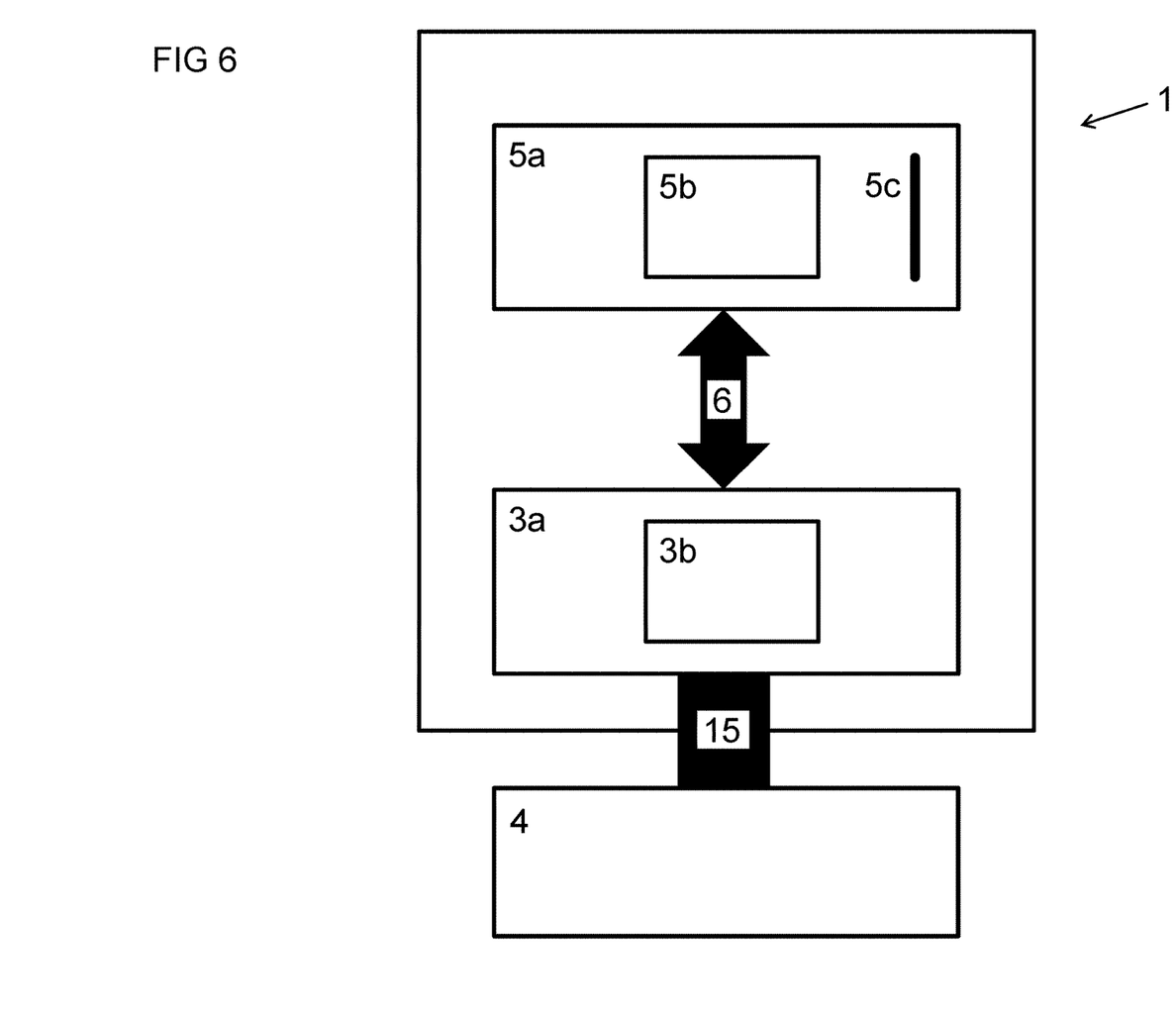
FIG. 6 depicts a room device having a dual-purpose bus connector for data transmission and for power supply, incorporating teachings of the present disclosure.

FIG. 6 shows a room unit 1 to be powered via a system communication bus 15. The system communication bus 15 can, by way of non-limiting example, comprise a network cable. In some embodiments, the system communication bus 15 comprises a power-over-ethernet connection. In some embodiments, the system communication bus 15 comprises a KNX® connection.

In some embodiments, there is a room device (1) comprising:
  two or more connectors (2a, 2b, 15) for providing building power to the room device (1);
  a device controller (3a) configured to operate a heating, ventilation and/or air-conditioning system (4);
  a device memory (3b) in operative communication with the device controller (3a);
  wherein the device memory (3b) and the device controller (3a) require building power for standard operation;
  a transponder controller (5a) and an antenna (5c) for near field communication;
  a transponder memory (5b) in operative communication with the transponder controller (5a);
  a device firmware stored in the device memory (3b), the device firmware including instructions causing the device controller (3a) upon providing building power to the room device (1) to:
  connect to the transponder controller (5a) such that the device controller (3a) is in operative communication with the transponder controller (5a);
  read a device version stored in the device memory (3b);
  read a configuration version stored in the transponder memory (5b);
  determine if the configuration version is compatible with the device version;
  if the configuration version is compatible with the device version:
  transfer initial configuration data stored in the transponder memory (5b) to the device memory (3b); and
  thereafter use the initial configuration data in operation of the system (4).

In some embodiments, there is a room device (1) comprising:
  two or more connectors (2a, 2b, 15) for providing building power to the room device (1);
  a device controller (3a) configured to operate a heating, ventilation and/or air-conditioning system (4);
  a device memory (3b) in operative communication with the device controller (3a);
  wherein the device memory (3b) and the device controller (3a) require building power for standard operation;
  a transponder controller (5a) and an antenna (5c) for near field communication;
  a transponder memory (5b) in operative communication with the transponder controller (5a), the transponder memory (5b) storing a configuration version and an address list;
  wherein the transponder controller (5a) is powerable by the antenna (5c);
  wherein the room device (1) comprises a transponder firmware stored in the transponder memory (5b), the transponder firmware including instructions causing the transponder controller (5a) upon providing power to the transponder controller (5a) to:
  connect to a handheld device (10) such that the transponder controller (5a) is in operative communication with the handheld device (10);
  determine an address of the handheld device (10) based on the connection to the handheld device (10);

determine if the address list comprises the address of the handheld device (10);

if the address list comprises the address of the handheld device (10):

produce a signal indicative of the configuration version;

transmit the signal indicative of the configuration version to the handheld device (10);

after transmission of the signal indicative of the configuration version, receive initial configuration data from the handheld device (10);

store the initial configuration data in the transponder memory (5*b*);

the room device (1) further comprising a device firmware stored in the device memory (3*b*), the device firmware including instructions causing the device controller (3*a*) upon providing building power to the room device (1) to:

connect to the transponder controller (5*a*) such that the device controller (3*a*) is in operative communication with the transponder controller (5*a*);

read a device version stored in the device memory (3*b*);

read the configuration version stored in the transponder memory (5*b*);

determine if the configuration version is compatible with the device version;

if the configuration version is compatible with the device version:

transfer the initial configuration data stored in the transponder memory (5*b*) to the device memory (3*b*); and thereafter use the initial configuration data in operation of the system (4).

In some embodiments, he device controller (3*a*) is configured to operate a heating, ventilation and/or air-conditioning system (4) by setting a temperature setpoint of the heating, ventilation and/or air-conditioning system (4); and/or by setting a valve position of a heat exchanger of the heating, ventilation and/or air-conditioning system (4); and/or by setting a valve position of a heat exchanger within the heating, ventilation and/or air-conditioning system (4); and/or by controlling blinds of the heating, ventilation and/or air-conditioning system (4); and/or by controlling blinds within the heating, ventilation and/or air-conditioning system (4); and/or sending alarms related to the heating, ventilation and/or air-conditioning system (4); and/or evaluating trends related to the heating, ventilation and/or air-conditioning system (4).

In some embodiments, the air-conditioning system (4) is or comprises a building management system.

In some embodiments, the antenna (5*c*) comprises an antenna for near field communication in compliance with ISO/IEC 18000-3:2010. In some embodiments, communication and/or any communication interfaces may be implemented in compliance with at least one of the standards: ISO/IEC 15693-1:2010, ISO/IEC 15693-1:2009, and/or ISO/IEC 15693-1:2006.

In some embodiments, the device firmware includes instructions causing the device controller (3*a*) upon providing building power to the room device (1) to read a configuration version stored in the transponder memory (5*b*) via the transponder controller (5*a*).

In some embodiments, building power is provided to the device controller (3*a*) via the two or more wires (2*a*, 2*b*, 15). The transponder controller (5*a*) and the transponder memory (5*b*) are preferably powerable by the device controller (3*a*). In some embodiments, the device memory (3*b*) powerable by the device controller (3*a*).

In some embodiments, the device controller (3*a*) comprises a microprocessor and/or a microcontroller. In some embodiments, the transponder controller (5*a*) comprises a microprocessor and/or a microcontroller.

In some embodiments, the device controller (3*a*) is a device controller (3*a*) for controlling a portion of the heating, ventilation and/or air-conditioning system (4). The device memory (3*b*) can comprise a non-volatile device memory (3*b*).

In some embodiments, the room device (1) comprises a device for heating, ventilation and/or air-conditioning. The room device (1) can also comprise a transponder device (5*a*, 5*b*, 5*c*), the transponder device comprising the transponder memory (5*b*), the transponder controller (5*a*), and the antenna (5*c*). In some embodiments, the antenna (5*c*) is in operative communication with the transponder controller (5*a*). In some embodiments, the transponder controller (5*a*) electrically connects to the antenna (5*c*).

In some embodiments, the room device (1) comprises a first communication bus (6). The first communication bus (6) couples and/or directly couples the device controller (3*a*) to the transponder controller (5*a*). The first communication bus (6) enables communication from the transponder controller (5*a*) to the device controller (3*a*). The first communication bus (6) can also enable communication from the device controller (3*a*) to the transponder controller (5*a*). The first communication bus (6) preferably comprises a first digital communication bus (6). The first communication bus (6) can use a first predetermined communication bus protocol such as a first digital communication bus protocol. In some embodiments, the room device (1) comprises a wired connection such as a wired electric connection between the device controller (3*a*) and the transponder controller (5*a*).

In some embodiments, the room device (1) comprises a second communication bus (7). The second communication bus (7) couples and/or directly couples the device controller (3*a*) to the heating, ventilation and/or air-conditioning system (4). The second communication bus (7) enables communication from the device controller (3*a*) to the heating, ventilation and/or air-conditioning system (4). In some embodiments, the second communication bus (7) can also enable communication from the heating, ventilation and/or air-conditioning system (4) to the device controller (3*a*). In some embodiments, the second communication bus (7) comprises a second digital communication bus (7). In some embodiments, the second communication bus (7) can use a second predetermined communication bus protocol such as a second digital communication bus protocol. In some embodiments, the room device (1) provides a wired connection such as a wired electric connection from the device controller (3*a*) to the heating, ventilation and/or air-conditioning system (4). The second communication bus (7) is preferably different from the first communication bus (6).

In some embodiments, the transponder memory (5*b*) is powerable by the transponder controller (5*a*) and by the antenna (5*c*). In some embodiments, the transponder controller (5*a*) is powerable by the antenna (5*c*) and that the transponder memory (5*b*) is powerable by the transponder controller (5*a*). In some embodiments, the antenna (5*c*) is powerable by a radio frequency signal such as a near field communication signal from a handheld device (10). In some embodiments, the transponder memory (5*b*) electrically connects to the transponder controller (5*a*). In some embodiments, the transponder controller (5*a*) can electrically connect to the antenna (5c). In some embodiments, the transponder memory (5b) can comprise a non-volatile transponder memory (5b).

In some embodiments, the room device (1) is packed inside a cardboard box (8); wherein the cardboard box (8) must be opened in order to connect building power to the two or more connectors (2a, 2b, 15); wherein the cardboard box (8) comprises one or more markings (9) indicating a location for placement of a handheld device (10) for best wireless communication with the transponder controller (5a) and with the antenna (5c); and the handheld device (10) is operable to communicate using near field communication.

In some embodiments, a cardboard box (8) comprises any of the room devices (1) of the instant disclosure; wherein the room device (1) is packed inside the cardboard box (8); wherein the cardboard box (8) must be opened in order to connect building power to the two or more connectors (2a, 2b, 15) of the room device (1); wherein the cardboard box (8) comprises one or more markings (9) indicating a location for placement of a handheld device (10) for best wireless communication with the transponder controller (5a) and with the antenna (5c) of the room device (1); and wherein the handheld device (10) is operable to communicate using near field communication.

In some embodiments, the handheld device (10) comprises a handheld device that is operable to communicate using near field communication in compliance with ISO/IEC 18000-3:2010.

In some embodiments, handheld device (10) comprises a mobile handheld device and/or a mobile computing device. In some embodiments, the handheld device (10) comprises a processor. In some embodiments, the handheld device (10) is operable to wirelessly communicate using near field communication. The handheld device can, by way of non-limiting example, comprise a mobile computer and/or a tablet computer and/or a mobile handheld device and/or a mobile phone and/or a smart mobile phone. In some embodiments, the handheld device (10) is different from the room device (1).

In some embodiments, the room device (1) comprises an integrated circuit of the room device (1). The integrated circuit of the room device (1) can comprise the device controller (3a) and the device memory (3b). The device controller (3a) and the device memory (3b) may be arranged on the same first system on a chip.

In some embodiments, the transponder device (5a, 5b, 5c) comprises an integrated circuit of the transponder device (5a, 5b, 5c). The integrated circuit of the transponder device (5a, 5b, 5c) can comprise the transponder controller (5a) and the transponder memory (5b). The integrated circuit of the transponder device (5a, 5b, 5c) can also comprise the antenna (5c) and/or a portion of the antenna (5c). The transponder controller (5a) and the transponder memory (5b) may be arranged on the same second system on a chip. In some embodiments, the second system on a chip is different from the first system on a chip.

In some embodiments, the configuration version comprises a configuration revision number and the device version comprises a device revision number; wherein the device firmware includes instructions causing the device controller (3a) upon providing building power to the room device (1) to: compare the configuration revision number to the device revision number; if the configuration revision number matches and/or equals the device revision number: transfer the initial configuration data stored in the transponder memory (5b) to the device memory (3b); and thereafter use the initial configuration data in operation of the system (4).

In some embodiments, the configuration version comprises a configuration revision number and the device version comprises a device revision number; wherein the device firmware includes instructions causing the device controller (3a) upon providing building power to the room device (1) to: compare the configuration revision number to the device revision number; if the configuration revision number is less than or equals the device revision number: transfer the initial configuration data stored in the transponder memory (5b) to the device memory (3b); and thereafter use the initial configuration data in operation of the system (4).

In some embodiments, devices are compatible with configurations when the revision numbers of such configurations are less than or equal to the revision numbers of the respective devices. This setting affords backward compatibility and/or downward compatibility.

In some embodiments, the device firmware includes instructions causing the device controller (3a) upon providing building power to the room device (1) to: read a lookup table stored in the device memory (3b); use the lookup table to determine if the configuration version is compatible with the device version; if the configuration version is compatible with the device version: transfer the initial configuration data stored in the transponder memory (5b) to the device memory (3b); and thereafter use the initial configuration data in operation of the system (4).

In some embodiments, the lookup table comprises a compatibility table. The lookup table maps device versions to compatible configuration versions. The lookup table ideally also maps configuration versions to compatible device versions. The lookup table ideally has a plurality of entries mapping device versions to compatible configuration versions.

In some embodiments, the configuration version comprises a configuration revision number and the device version comprises a device revision number; wherein the device firmware includes instructions causing the device controller (3a) upon providing building power to the room device (1) to: read a lookup table stored in the device memory (3b); use the lookup table to determine if the configuration revision number is compatible with the device revision number; if the configuration revision number is compatible with the device revision number: transfer the initial configuration data stored in the transponder memory (5b) to the device memory (3b); and thereafter use the initial configuration data in operation of the system (4).

In some embodiments, the lookup table maps device revision numbers to compatible configuration revision numbers. In some embodiments, the lookup table has a plurality of entries mapping device revision numbers to compatible configuration revision numbers.

In some embodiments, the device firmware includes instructions causing the device controller (3a) upon providing building power to the room device (1) to, after transferring the initial configuration data, use the initial configuration data in communication within the system (4) and operation of the system (4).

In some embodiments, the device firmware includes instructions causing the device controller (3a) upon providing building power to the room device (1) to, after transferring the initial configuration data, use the initial configuration data in communication with the system (4) and in operation of the system (4).

In some embodiments, the transponder controller (5a) is powerable by the antenna (5c); wherein the room device (1) comprises a transponder firmware stored in the transponder memory (5b), the transponder firmware including instructions causing the transponder controller (5a) upon providing power to the transponder controller (5a) to: connect to a handheld device (10) such that the transponder controller (5a) is in operative communication with the handheld device (10); produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the configuration version comprises a configuration revision number. The signal indicative of the configuration version then comprises a signal indicative of a configuration revision number.

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); determine an address of the handheld device (10) based on the connection to the handheld device (10); read an address list stored in the transponder memory (5b); determine if the address list comprises the address of the handheld device (10); if the address list comprises the address of the handheld device (10): produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the address list comprises a plurality of addresses. In some embodiments, the address list comprises a plurality of addresses of handheld devices (10).

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); receive a signal indicative of an address of the handheld device (10) from the handheld device (10); produce an address of the handheld device (10) from the signal indicative of an address of the handheld device (10); read an address list stored in the transponder memory (5b); determine if the address list comprises the address of the handheld device (10); if the address list comprises the address of the handheld device (10): produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); receive an access key from the handheld device (10); read a transponder key stored in the transponder memory (5b); determine if the access key matches and/or equals the transponder key; if the access key matches and/or equals the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); receive a signal indicative of an access key from the handheld device (10); produce an access key from the signal indicative of an access key; read a transponder key stored in the transponder memory (5b); determine if the access key matches and/or equals the transponder key; if the access key matches and/or equals the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); receive an access key from the handheld device (10); compute a hashed access key from the access key using a hash function; read a transponder key stored in the transponder memory (5b); determine if the hashed access key matches and/or equals the transponder key; if the hashed access key matches and/or equals the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the room devices (1) have a transponder firmware, wherein the transponder firmware includes instructions causing the transponder controller (5a) upon providing power to the transponder controller (5a) to: connect to a handheld device (10) such that the transponder controller (5a) is in operative communication with the handheld device (10); receive a signal indicative of an access key from the handheld device (10); produce an access key from the signal indicative of an access key; compute a hashed access key from the access key using a hash function; read a transponder key stored in the transponder memory (5b); determine if the hashed access key matches and/or equals the transponder key; if the hashed access key matches and/or equals the transponder key: produce a signal indicative of the configuration version; transmit the signal indicative of the configuration version to the handheld device (10); after transmission of the signal indicative of the configuration version, receive the initial configuration data from the handheld device (10); and store the initial configuration data in the transponder memory (5b).

In some embodiments, the hash function comprises at least one of a message digest 5 type hash function; a secure hash algorithm 1 type hash function; a secure hash algorithm 2 type hash function; a secure hash algorithm 3 type hash function; a secure hash algorithm 256 type hash function; and/or a bcrypt type hash function.

In some embodiments, the room device (1) comprises a device switch (11) connected to the device controller (3a); wherein the device switch (11) is selectively moveable between an enabled position and a disabled position; wherein the device firmware includes instructions causing the device controller (3a) upon providing building power to the room device (1) to: read a first position signal from the device switch (11); produce a first position value from the first position signal; and if the first position value indicates that the device switch (11) is in its enabled position: connect to the transponder controller (5a) such that the device controller (3a) is in operative communication with the transponder controller (5a).

In some embodiments, the device firmware includes instructions causing the device controller (3a) upon providing building power to the room device (1) to: if and only if the first position value indicates that the device switch (11) is in its enabled position: connect to the transponder controller (5a) such that the device controller (3a) is in operative communication with the transponder controller (5a).

In some embodiments, the device switch (11) can, by way of non-limiting example, comprise a mechanical switch such as a button and/or a dual-in-line switch.

In some embodiments, the room devices (1) have a transponder firmware, wherein the room device (1) comprises a transponder switch (12) connected to the transponder controller (5a); wherein the transponder switch (12) is selectively moveable between an enabled position and a disabled position; wherein the transponder firmware includes instructions causing the transponder controller (5a) upon providing power to the transponder controller (5a) to: read a second position signal from the transponder switch (12); produce a second position value from the second position signal; and if the second position value indicates that the transponder switch (12) is in its enabled position: connect to a handheld device (10) such that the transponder controller (5a) is in operative communication with the handheld device (10).

In some embodiments, the room devices (1) have a transponder firmware, wherein the transponder firmware includes instructions causing the transponder controller (5a) upon providing power to the transponder controller (5a) to: if and only if the second position value indicates that the transponder switch (12) is in its enabled position: connect to a handheld device (10) such that the transponder controller (5a) is in operative communication with the handheld device (10).

In some embodiments, the transponder switch (12) can, by way of non-limiting example, comprise a mechanical switch such as a button and/or a dual-in-line switch. The transponder switch (12) may be different from the device switch (11).

In some embodiments, the room device (1) comprises a first visible indicator (13) connected to the device controller (3a); wherein the device firmware includes instructions causing the device controller (3a) upon providing building power to the room device (1) to: determine if the configuration version is compatible with the device version; and if the configuration version is compatible with the device version, activate the first visible indicator (13).

In some embodiments, the first visible indicator (13) comprises a light emitting diode. In a special embodiment, the first visible indicator (13) comprises a green light emitting diode and/or a blue light emitting diode. The first visible indicator (13) is advantageously configured and/or situated to provide an indication to a user.

The present disclosure also teaches any of the room devices (1) described herein, wherein the configuration version comprises a configuration revision number and wherein the device version comprises a device revision number; wherein the room device (1) comprises a first visible indicator (13) connected to the device controller (3a); wherein the device firmware includes instructions causing the device controller (3a) upon providing building power to the room device (1) to: compare the configuration revision number to the device revision number; and if the configuration revision number matches and/or equals the device revision number: activate the first visible indicator (13).

In some embodiments, the configuration version comprises a configuration revision number and wherein the device version comprises a device revision number; wherein the room device (1) comprises a first visible indicator (13) connected to the device controller (3a); wherein the device firmware includes instructions causing the device controller (3a) upon providing building power to the room device (1) to: compare the configuration revision number to the device revision number; and if the configuration revision number is less than or equals the device revision number: activate the first visible indicator (13).

In some embodiments, the room device (1) comprises a first visible indicator (13) connected to the device controller (3a); wherein the device firmware includes instructions causing the device controller (3a) upon providing building power to the room device (1) to: read a lookup table stored in the device memory (3b); use the lookup table to determine if the configuration version is compatible with the device version; if the configuration version is compatible with the device version: activate the first visible indicator (13).

In some embodiments, the room devices (1) have a first visible indicator (13), wherein the room device (1) comprises a second visible indicator (14) connected to the device controller (3a); wherein the device firmware includes instructions causing the device controller (3a) upon providing building power to the room device (1) to: determine if the configuration version is compatible with the device version; and if the configuration version is compatible with the device version: activate the first visible indicator (13); otherwise: activate the second visible indicator (14).

In some embodiments, the second visible indicator (14) comprises a light emitting diode. In some embodiments, the second visible indicator (14) comprises a red light emitting diode. The second visible indicator (14) may be configured and/or situated to provide an indication to a user. In some embodiments, the second visible indicator (14) is different from the first visible indicator (13).

In some embodiments, the room devices (1) have a first visible indicator (13), wherein the configuration version comprises a configuration revision number and wherein the device version comprises a device revision number; wherein the room device (1) comprises a second visible indicator (14) connected to the device controller (3a); wherein the device firmware includes instructions causing the device controller (3a) upon providing building power to the room device (1) to: compare the configuration revision number to the device revision number; and if the configuration revision number matches and/or equals the device revision number: activate the first visible indicator (13); if the configuration revision number is different from the device revision number: activate the second visible indicator (14).

In some embodiments, the room devices (1) have a first visible indicator (13), wherein the configuration version comprises a configuration revision number and wherein the device version comprises a device revision number; wherein the room device (1) comprises a second visible indicator (14) connected to the device controller (3a); wherein the device firmware includes instructions causing the device controller (3a) upon providing building power to the room device (1) to: compare the configuration revision number to the device revision number; and if the configuration revision number is less than or equals the device revision number: activate the first visible indicator (13); if the configuration revision number is larger than and/or exceeds the device revision number: activate the second visible indicator (14).

In some embodiments, the room devices (1) have a first visible indicator (13), wherein the room device (1) comprises a second visible indicator (14) connected to the device controller (3a); wherein the device firmware includes instructions causing the device controller (3a) upon providing building power to the room device (1) to: read a lookup table stored in the device memory (3b); use the lookup table to determine if the configuration version is compatible with the device version; if the configuration version is compatible with the device version: activate the first visible indicator (13); otherwise: activate the second visible indicator (14).

In some embodiments, the room device (1) comprises a system communication bus (15) configured to couple the device controller (3a) to the heating, ventilation and/or air-conditioning system (4) such that the device controller (3a) enters into operative communication with the heating, ventilation and/or air-conditioning system (4); wherein the system communication bus (15) comprises the two or more wires for providing building power to the room device (1); and wherein the system communication bus (15) is configured to transmit data signals of the system communication bus (15) along with building power.

In some embodiments, the two or more connectors comprise two or more wires.

In some embodiments, the room device (1) comprises a system communication bus (15) configured to couple the device controller (3a) to the heating, ventilation and/or air-conditioning system (4) such that the device controller (3a) is in operative communication with the heating, ventilation and/or air-conditioning system (4).

In some embodiments, the system communication bus (15) comprises a system communication cable and/or a communication connector and/or a twisted-pair cable.

In some embodiments, the system communication bus (15) comprises a power-over-ethernet interface in accordance with IEEE 802.3af-2003, June 2003. A connection of the room device (1) to the heating, ventilation and/or air-conditioning system (4) via a power-over-ethernet interface allows the room device (1) to draw and/or to harvest building power from the heating, ventilation and/or air-conditioning system (4). In so doing, the room device (1) becomes more independent of power-outlets installed in a building.

REFERENCE NUMERALS 1 room device
2a, 2b wires
3a device controller
3b device memory
4 system for heating, ventilation, and/or air-conditioning
5a transponder controller
5b transponder memory
5c antenna
6 communication bus
7 communication bus
8 cardboard box
9 one or more markings
10 handheld device
11 device switch
12 transponder switch
13 first visible indicator
14 second visible indicator
15 system communication bus

The invention claimed is:

1. A room device comprising:
two connectors for providing building power to the room device;
a controller configured to operate a heating, ventilation, and/or air-conditioning system;
a memory in operative communication with the controller;
wherein the memory and the controller both require building power for standard operation;
a transponder controller and an antenna for near field communication;
a transponder memory in operative communication with the transponder controller, the transponder memory storing a configuration version and an address list;
wherein the transponder controller is powered by the antenna;
a transponder firmware stored in the transponder memory, the transponder firmware including instructions causing the transponder controller to:
connect to a handheld device;
determine an address of the handheld device based on a connection to the handheld device;
determine whether the address list comprises the address of the handheld device;
if the address list comprises the address of the handheld device: produce a signal indicative of the configuration version, transmit the signal to the handheld device, after transmitting the signal, receive initial configuration data from the handheld device, and store the initial configuration data in the transponder memory;
a firmware stored in the device memory, the firmware including instructions causing the device controller to:
connect to the transponder controller;
read a device version stored in the memory;
read the configuration version stored in the transponder memory;
determine whether the configuration version is compatible with the device version;
if the configuration version is compatible with the device version: transfer the initial configuration data stored in the transponder memory to the memory, and thereafter use the initial configuration data in operation of the system.

2. The room device according to claim 1, wherein:
the configuration version includes a configuration revision number;
the device version comprises a device revision number;
the firmware includes instructions causing the controller to:
compare the configuration revision number to the device revision number; and
if the configuration revision number matches the device revision number: transfer the initial configuration data stored in the transponder memory to the device memory, and thereafter use the initial configuration data in operation of the system.

3. The room device according to claim 1, wherein:
the configuration version comprises a configuration revision number;
the device version comprises a device revision number; and
the device firmware includes instructions causing the device controller to:
compare the configuration revision number to the device revision number; and
if the configuration revision number is less than or equals the device revision number: transfer the initial configuration data stored in the transponder memory to the memory, and thereafter use the initial configuration data in operation of the system.

4. The room device according to claim 1, wherein the device firmware includes instructions causing the device controller to:
read a lookup table stored in the memory;
use the lookup table to determine whether the configuration version is compatible with the device version; and
if the configuration version is compatible with the device version, transfer the initial configuration data stored in the transponder memory to the device, and thereafter use the initial configuration data in operation of the system.

5. The room device according to claim 1, wherein:
the configuration version comprises a configuration revision number and the device version comprises a device revision number;
the device firmware includes instructions causing the device controller to:
read a lookup table stored in the memory;
use the lookup table to determine whether the configuration revision number is compatible with the device revision number; and
if the configuration revision number is compatible with the device revision number, transfer the initial configuration data stored in the transponder memory to the memory, and thereafter use the initial configuration data in operation of the system.

6. The room device according to claim 1, wherein the device firmware includes instructions causing the device controller to, after transferring the initial configuration data, use the initial configuration data in communication within the system and operation of the system.

7. The room device according to claim 1, wherein the transponder firmware includes instructions causing the transponder controller to read the configuration version stored in the transponder memory.

8. The room device according to claim 1, wherein the transponder firmware includes instructions causing the transponder controller to read the address list stored in the transponder memory.

9. The room device according to claim 1, wherein the transponder firmware includes instructions causing the transponder controller to:
connect to a handheld device such that the transponder controller is in operative communication with the handheld device;
receive an access key from the handheld device;
read a transponder key stored in the transponder memory;
determine whether the access key matches the transponder key;
if the access key matches the transponder key: produce a signal indicative of the configuration version, transmit the signal to the handheld device, after transmission of the signal, receive the initial configuration data from the handheld device, and store the initial configuration data in the transponder memory.

10. The room device according to claim 1, wherein the transponder firmware includes instructions causing the transponder controller to:
connect to a handheld device such that the transponder controller is in operative communication with the handheld device;
receive an access key from the handheld device;
compute a hashed access key from the access key using a hash function;
read a transponder key stored in the transponder memory;
determine whether the hashed access key matches the transponder key; and
if the hashed access key matches the transponder key, produce a signal indicative of the configuration version, transmit the signal to the handheld device, after transmission of the signal, receive the initial configuration data from the handheld device, and store the initial configuration data in the transponder memory.

11. The room device according to claim 1, further comprising a switch connected to the controller;
wherein the switch moves between an enabled position and a disabled position;
the device firmware includes instructions causing the controller to:
read a first position signal from the switch;
produce a first position value from the first position signal; and
if the first position value indicates that the switch is in its enabled position, connect to the transponder controller such that the controller is in operative communication with the transponder controller.

12. The room device according to claim 1, further comprising a transponder switch connected to the transponder controller;
wherein the transponder switch moves between an enabled position and a disabled position;
the transponder firmware includes instructions causing the transponder controller to:
read a second position signal from the transponder switch;
produce a second position value from the second position signal; and
if the second position value indicates that the transponder switch is in its enabled position, connect to a handheld device such that the transponder controller is in operative communication with the handheld device.

13. The room device according to claim 1, further comprising a first visible indicator connected to the device controller;
wherein the device firmware includes instructions causing the device controller to:
determine if the configuration version is compatible with the device version; and
if the configuration version is compatible with the device version, activate the first visible indicator.

14. The room device according to claim 13, further comprising a second visible indicator connected to the controller;
wherein the device firmware includes instructions causing the device controller to:
determine whether the configuration version is compatible with the device version; and
if the configuration version is compatible with the device version, activate the first visible indicator;
otherwise, activate the second visible indicator.

15. The room device according to claim 1, further comprising a system communication bus configured to couple the controller to the heating, ventilation, and/or air-conditioning system such that the device controller enters into operative communication with the heating, ventilation, and/or air-conditioning system;
- wherein the system communication bus comprises two wires for providing building power to the room device; and
- the system communication bus is configured to transmit data signals of the system communication bus along with building power.

\* \* \* \* \*